US007836156B1

(12) United States Patent  (10) Patent No.:     US 7,836,156 B1
Ou et al.                       (45) Date of Patent:        Nov. 16, 2010

(54) METHOD AND APPARATUS FOR ANALYZING NETWORK INFRASTRUCTURE

(75) Inventors: Chao-Wei Ou, Poughkeepsie, NY (US); Prasanna Patil, Elmsford, NY (US); Lida He, Sleepy Hollow, NY (US); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 375 days.

(21) Appl. No.: 12/059,416

(22) Filed: Mar. 31, 2008

(51) Int. Cl.
    *G06F 13/00*    (2006.01)
(52) U.S. Cl. .................. 709/220; 709/224; 719/318
(58) Field of Classification Search .......... 709/220, 709/223, 224, 238, 250; 719/318
    See application file for complete search history.

(56)         References Cited

U.S. PATENT DOCUMENTS 5,761,502 A  *  6/1998  Jacobs ........................... 1/1

7,003,433 B2    2/2006  Yemini et al.
7,525,425 B2 *  4/2009  Diem ..................... 340/539.13
2004/0210654 A1 * 10/2004 Hrastar ....................... 709/224

* cited by examiner

*Primary Examiner*—Viet Vu
(74) *Attorney, Agent, or Firm*—Chapin IP Law, LLC; Barry W. Chapin, Esq.

(57)         ABSTRACT

A generic analysis model is applicable to a variety of network infrastructure domains, and operable for causal analysis in a common manner independently of the corresponding underlying domain. The generic analysis model may be employed to model root cause analysis and impact analysis for different resource management systems such as enterprise networks, storage area networks, service provider networks and business process management. Such a model improves performance and scalability by simplifying analysis model for a given solution, and decouples the development from topology building and analysis implementation.

20 Claims, 12 Drawing Sheets

```
interface FaultAnalysisElement : MR_Object {                                           ⎫
    relationshipset Causes, FaultAnalysisElement, CausedBy;           — 302            ⎪
    relationshipset CausedBy, FaultAnalysisElement, Causes;           — 304            ⎪ 320
    relationshipset Impacts, FaultAnalysisElement, ImpactedBy;        — 306            ⎪
    relationshipset ImpactedBy, FaultAnalysisElement, Impacts;                         ⎪
    relationshipset Aggregates, FaultAnalysisElement, AggregateTo;                     ⎪
    relationship(set) AggregateTo, FaultAnalysisElement, Aggregates;                   ⎭
    event CodebookEvent;                                              — 330
    event Impacted;                                                   — 332
    symptom FaultSymptom
        = CodebookEvent, FaultAnalysisElement_Causes_FaultSymptom,                     ⎫
          Impacted explains, FaultAnalysisElement_Impacts_FaultSymptom explains;       ⎪
    propagate symptom FaultAnalysisElement_Causes_FaultSymptom                         ⎪
        = FaultAnalysisElement, Causes, FaultSymptom;                 — 334            ⎪
    propagate symptom FaultAnalysisElement_Impacts_FaultSymptom                        ⎪ 310
        = FaultAnalysisElement, Impacts, FaultSymptom;                — 336            ⎪
    aggregate FaultException                                                           ⎪
        = Failed, FaultAnalysisElement_Aggregates_FaultException;                      ⎪
    propagate aggregate FaultAnalysisElement_Aggregates_FaultException                 ⎪
        = FaultAnalysisElement, Aggregates, FaultException;           — 338            ⎭
    problem Down
        -> FaultSymptom, FaultSymptom explains;
};                                                                                   — 300
```

METHOD AND APPARATUS FOR ANALYZING NETWORK INFRASTRUCTURE

BACKGROUND

In a managed information environment, a network interconnects computing entities for sharing resources within a user community. This has evolved from sharing computational time to sharing information to providing services that rely on that rely on that interconnection. The computing entities are typically PCs and/or servers, and applications running on the computing entities provide the services, often in conjunction with the other computing entities via the network. Such services may include, for example, data storage and retrieval, media presentation, accounting, registration, and other functions, typically related to the ongoing operation of a business, corporation, or institution.

In an emerging global economy, as the services offered become increasingly important to the operation of the business the network infrastructure underlying the managed information environment typically grows well beyond the original design constrains for technology infrastructure and increases in complexity. This tends to force the network infrastructure toward segmentation at technological, policy, or physical boundaries that as a collective entity make up the network infrastructure. Typically, global companies grow through acquisition and the network infrastructure becomes like any other tangible asset—slow to be altered and may represent a version of technology, policy or physical boundaries that are different than the whole. These factors result in network infrastructures that tend to be widely distributed, non-uniform, and heterogeneous, meaning that there are dissimilar network entities and communication mediums across the network infrastructure. Network management of such a large distributed network presents many challenges. In particular, network management applications are presented with a complex network topology to assimilate and represent. As network management applications attempt to normalize and accommodate the various attributes and characteristics of the network entities, it can be problematic to monitor, diagnose, and maintain such networks in a scalable and timely manner.

SUMMARY

A managed information environment typically takes the form of network entities (i.e. PCs, servers, switches, routers) interconnected by an underlying network infrastructure (network) operating according to a predetermined protocol or medium, often referred to as an IT (Information Technology) Infrastructure. For example, the underlying network infrastructure may be a TCP/IP network, a Storage Area Network (SAN), or an optical network, to name several.

There is an emerging trend toward increasingly larger networks. As corporations grow and expand, the underlying network infrastructure also expands. Activities such as mergers and acquisitions may also add a geographically remote cluster to the expanding network infrastructure. Widespread use of Virtual Private Networks (VPNs), intranets, and related security promote such expansion.

In addition to the physical expansion, the networks are becoming increasingly critical to the business. Attempts are being made to ensure that technologies such as traffic shaping, traffic engineering, priority queuing, and others are employed to ensure that data is treated according to the proper Service Level Objective (SLO). Accordingly, diagnosing and maintaining network health becomes increasingly complex.

In the network infrastructure, the interconnections between the network entities define relationships with the other network entities. Such relationships usually include connectivity (communication) between the entities, and encompass aspects such as access paths, producer/consumer, queuing, and data sink/store associations between the network entities. Accordingly, when a particular fault or condition affecting a network entity occurs, it tends to affect other network entities according to these relationships. Conventional approaches to network management present shortcomings in identifying all symptoms of a problem and/or tracing such symptoms back to the underlying cause or condition. In a conventional complex network infrastructure, the symptoms manifesting a particular fault or condition typically follow these relationships, and may not be readily apparent due to attenuation between the network entities. In other words, in a complex network, the underlying cause of a problem or fault condition may at first be nonexistent or, if detected, appear unrelated to the actual underlying symptom or cause. Unfortunately, conventional network infrastructures suffer from the shortcoming that analyzing and diagnosing the symptom back to the condition or fault (cause) via the relationships is a time consuming and error prone process. Further, depending on a domain of the underlying network infrastructure (i.e. TCP/IP, SAN, optical, etc) the network entities exhibit different relationships to other network entities, and lend themselves to different analysis mechanisms. Such conventional approaches typically employ a so-called analysis model of network elements, which focuses on the topology of physically interconnected network elements. In contrast, as discussed further below, configurations herein invoke an analysis model based on causal relations between the network elements, rather than topology relations.

Conventional mechanisms employ a so-called "codebook" approach for diagnosing and processing events relating to faults and conditions. One implementation of a codebook is a matrix representation for correlating symptoms to possible causes or conditions. However, since such a matrix grows exponentially with possible causes and symptoms, the matrix tends to either be sparse or to be segmented based on discrete problem sets. This coupled with the high degree of interconnectivity in contemporary network designs leads to a point where the matrix cannot be pruned to a reasonable functional size. Therefore, scalability often presents implementation concerns when applied to a large network with many entities and thus a corresponding multiplicity of causes and symptoms. Further, such an approach does not lend itself well to representing probability of various causes or reflecting the corresponding topology of processed events. Configurations disclosed herein improve the performance of the codebook approach. The novel approach considers causal relationships between fault and symptoms as reported by infrastructure elements, rather than relying on topology dependencies and relationships. Thus, configurations discussed below perform separation of the topology model and analysis model. At the end, the "codebook" will depend on the analysis model Accordingly, configurations herein substantially overcome such shortcomings by providing a generic analysis model applicable to a variety of network infrastructure domains, and operable for causal analysis in a common manner independently of the corresponding underlying domain. The generic analysis model may be employed to provide root cause and impact analysis for different resource management systems such as enterprise networks, storage area networks, service provider networks and business process management, to name several. Such a model improves performance, scalability by simplifying analysis model for a given solution, and decouples the development from topology building and analysis implementation.

The generic analysis model defines the network as an analysis view of causal relationships, thus defining how the network entities affect each other, rather than how the network is physically configured, as in a topology view. In an example configuration, discussed further below, a topology view on a target network is transformed to an analysis view by identifying and classifying the relationships between the network entities. Therefore, the analysis model is agnostic to the domain of the network, and rather denotes the relationships, or cause/effect associations between the network entities, in a manner independent of the specific topology. Thus, the topology (i.e. domain) of the network may change without disrupting an analysis model based on such relationships. Alternatively, in some cases, the generated analysis model may add new components or modify relationship of current components.

In this manner, the generic analysis model disclosed herein substantially overcomes the shortcomings of event/cause analysis using a conventional topology view by defining the network infrastructure in terms of an analysis object that separates the topology data from the analysis data by defining the network in terms of relationships denoting symptoms and causes. Accordingly, the analysis object provides an analysis model, or view, applicable to a variety of network domains, rather than requiring a separate analysis and diagnostic methodology for each underlying network infrastructure domains. Further, the analysis object identifies different types of relationships having a causal effect based on the attenuation of the condition and underlying cause. In the example arrangement disclosed herein, a causes/caused by relationship denotes a root cause of a particular symptom or condition between related network entities. An impacts/impacted by relationship is employed for determining an impact analysis for alternate closure, and an aggregates/aggregates to relationship indicates multiple events which may be aggregated or combined into a single event, thus avoiding redundant, repetitive, and/or misleading information.

In further detail, the system and method of evaluating network health as disclosed herein includes identifying a topology view of a network, the topology view defining interconnections between network entities, and identifies the domain of the network, in which the domain is indicative of the set of network entities adapted for inclusion in the topology view. The method determines a set of relationships between the network entities identified in the topology view, such that each relationship included in the set of relationships between a plurality of network entities defines how events affect the related network entities defined by the relationship. An analysis processor translates, using the determined set of relationships, the topology view to an analysis view, such that the analysis view is independent of the topology and applicable to a variety of domains. Once the analysis view of the given domain is created, it is translated into a correlation matrix using a codebook root cause analysis methodology. The codebook, in the example arrangement, may be derived from a correlation of network symptoms (identified by events or the lack thereof) to causes, or problems. During ongoing monitoring of the network, symptomatic events are received and processed by the analysis engine and with the help of codebook, the result or root cause is diagnosed. The analysis processor receives an event indicative of a condition of at least one of the network entities, and traverses the analysis view to identify relationships corresponding to the network entity affected by the event, such that the affected entity has an effect on other network entities as defined by the relationships. The analysis processor then concludes the result that the event manifests on the other related network entities based on the relationships, and reports the results to a user or operator via an associated graphical user interface (GUI).

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations disclosed herein include an example network depicting a SAN domain operable for network health evaluation using the generic analysis element. A management application transforms a conventional topology view, or representation of a network into the generic, domain independent analysis view. The analysis view defines the network entities according to cause and effect relationships between the network entities, such as manageable entities in a SAN. For example, a cause relationship is shown by a storage array coupled to a switch, in which a failed port/FE adaptor on the switch causes a lost connection on the physical cable defining the connection. An impact relationship defines the loss of the connectivity between the switch and the storage array, and an aggregation relationship may be defined by alternate paths from the storage array which will receive additional volume due to the lost connection.

Figure 1:
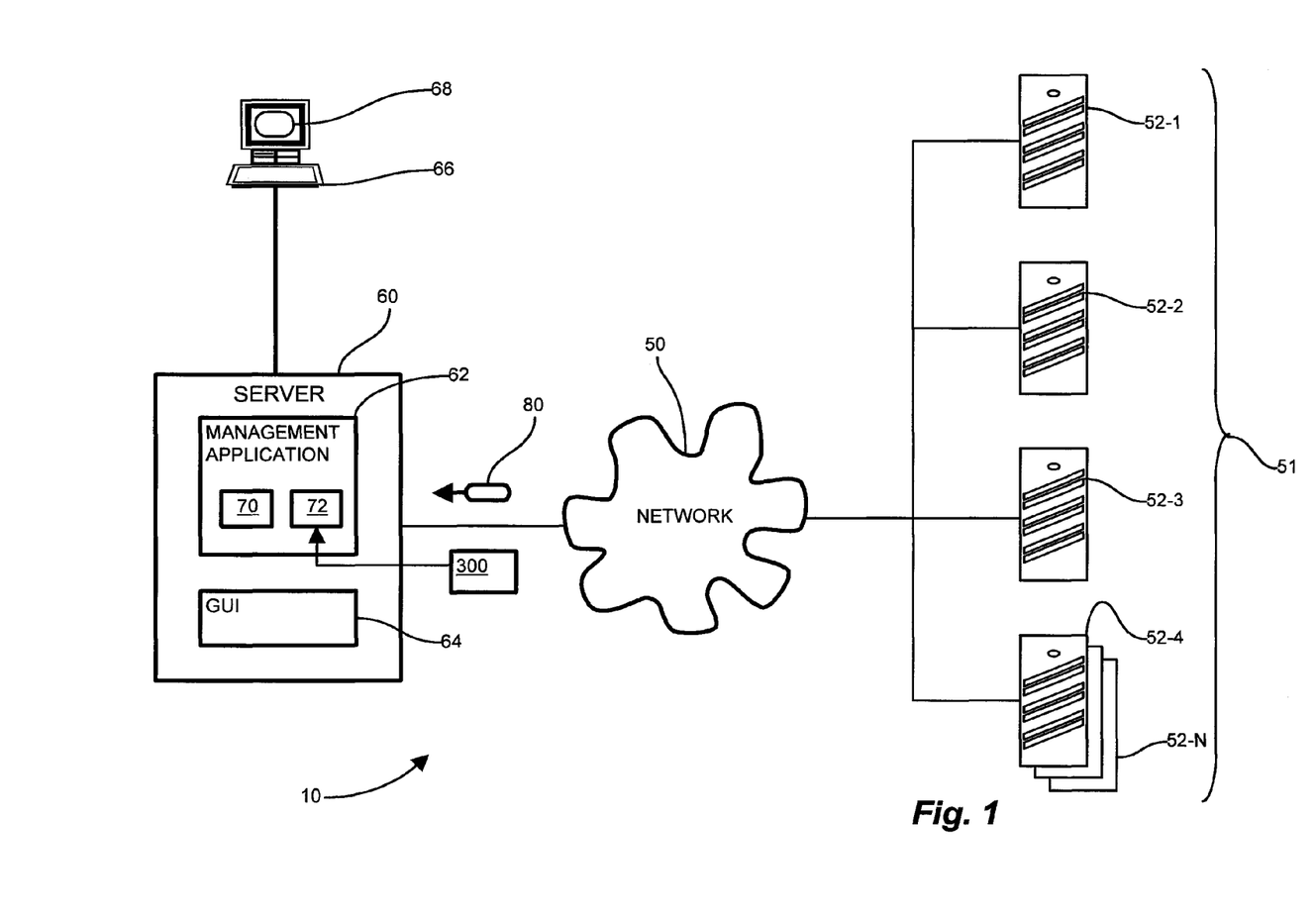
FIG. 1 shows a context diagram of a managed information environment suitable for use with configurations disclosed herein

FIG. 1 shows a context diagram of a managed information environment suitable for use with configurations disclosed herein. In the managed information environment 10, a network 50 interconnects manageable entities 51 for providing information services. The network 50 typically defines a particular domain, such as an IP network, an optical network, or, in the example shown, a storage area network (SAN). In the example SAN, the manageable entities 51 include storage arrays 52-1 . . . 52-N (52 generally), connected to a server 60 along with other manageable entities 51 (shown below in FIG. 3). A management application 62 provides monitoring and control of the manageable entities 51 in conjunction with a GUI application 64, responsive to a user console 66 via a display 68.

Generally, the management application 62 is conversant with a particular domain of manageable entities 51, such as SAN, IP, or optical, and maintains a topology view 70 and an analysis view 72 of the network 50. As will now be described further, the topology view 70 is specific to the domain of the network, and translates (transforms) to the analysis view 72, employing an analysis model depicting an analysis element 300, which is generic to various domains (described in detail in FIG. 5, below). The analysis view 72, or model, defines causal dependencies as relationships, and therefore is employed for analyzing, or tracing conditions and events to an underlying root cause, based on the dependencies. The analysis view 72 includes a plurality of instantiations of the analysis model 72', shown in further detail below in FIG. 3. Therefore, a plurality of instantiations of the analysis model 72' are operable for a network health evaluation regardless of, or independent of, the underlying domain of the topology model.

Figure 2:
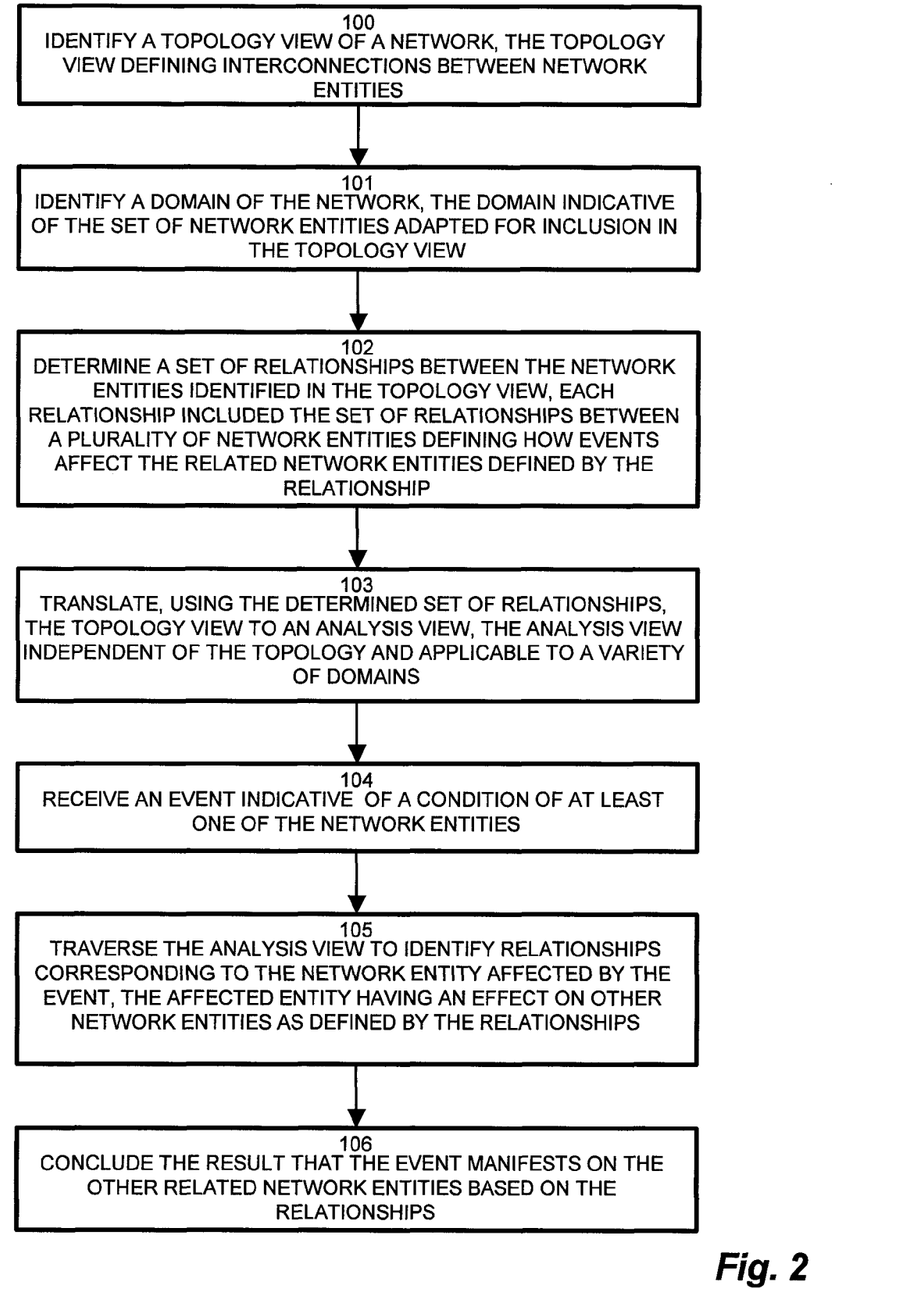
FIG. 2 shows a flowchart of network health evaluation in the environment of FIG. 1.

FIG. 2 shows a flowchart of network health evaluation in the environment of FIG. 1. Referring to FIGS. 1 and 2, the method of evaluating network health as disclosed herein includes, at step 100, identifying a topology view of the network 50 to provide a topology view 70, such that the topology view defines interconnections between network entities 51. The management application 62 identifies a domain of the network, in which the domain is indicative of the set of network entities 51 adapted for inclusion in the topology view 70, as depicted at step 101. The domain may refer to types like storage, hosts, network or managed entities that are part of the given network, e.g. US northeast network, for example. Using the topology view 70 and a set of entities 51 in the domain, the management application 62 determines a set of relationships between the network entities 51 identified in the topology view 70, such that each relationship in the set of relationships between a plurality of network entities 51 defines how events 80 affect the related network entities 51 defined by the relationship, as shown at step 102. Further, in some cases, a particular fault event is not directly reported by any network entity, e.g. router down. Such occurrences are diagnosed from set events reported by related network entities, thus illustrating how faults and events affect the related network entities. The management application 62 translates, using the determined set of relationships, the topology view 70 to the analysis view 72, such that the analysis view 72 is independent of the topology and applicable to a variety of domains, as shown at step 103.

Following the generation of the analysis view, 72, during normal operation of the network 50, the management application 62 receives an event 80, in which the event 80 is indicative of a condition of at least one of the network entities 51, as depicted at step 104. The management application invokes an analysis processor 82 (FIG. 3, below) traverse the analysis view 72 to identify relationships corresponding to the network entity 51 affected by the event 80, in which the affected entity 51 has an effect on other network entities 51 as defined by the relationships, as disclosed at step 105. Additional events may be received to diagnose particular faults in the network, as described below. When the analysis processor 82 receives multiple events 80, a correlation algorithm evaluates these events 80 and provide the result. The analysis processor 65 then concludes the result that the event 80 manifests, or has, on the other related network entities 51 based on the relationships, as depicted at step 106, using the above described codebook or other matrix or correlation. The relationships therefore allow the analysis processor 65 to propagate the effect of the event 80 to other entities 51 affected via the relationship, and report the results to a user, as will now be discussed in further detail.

Figure 3:
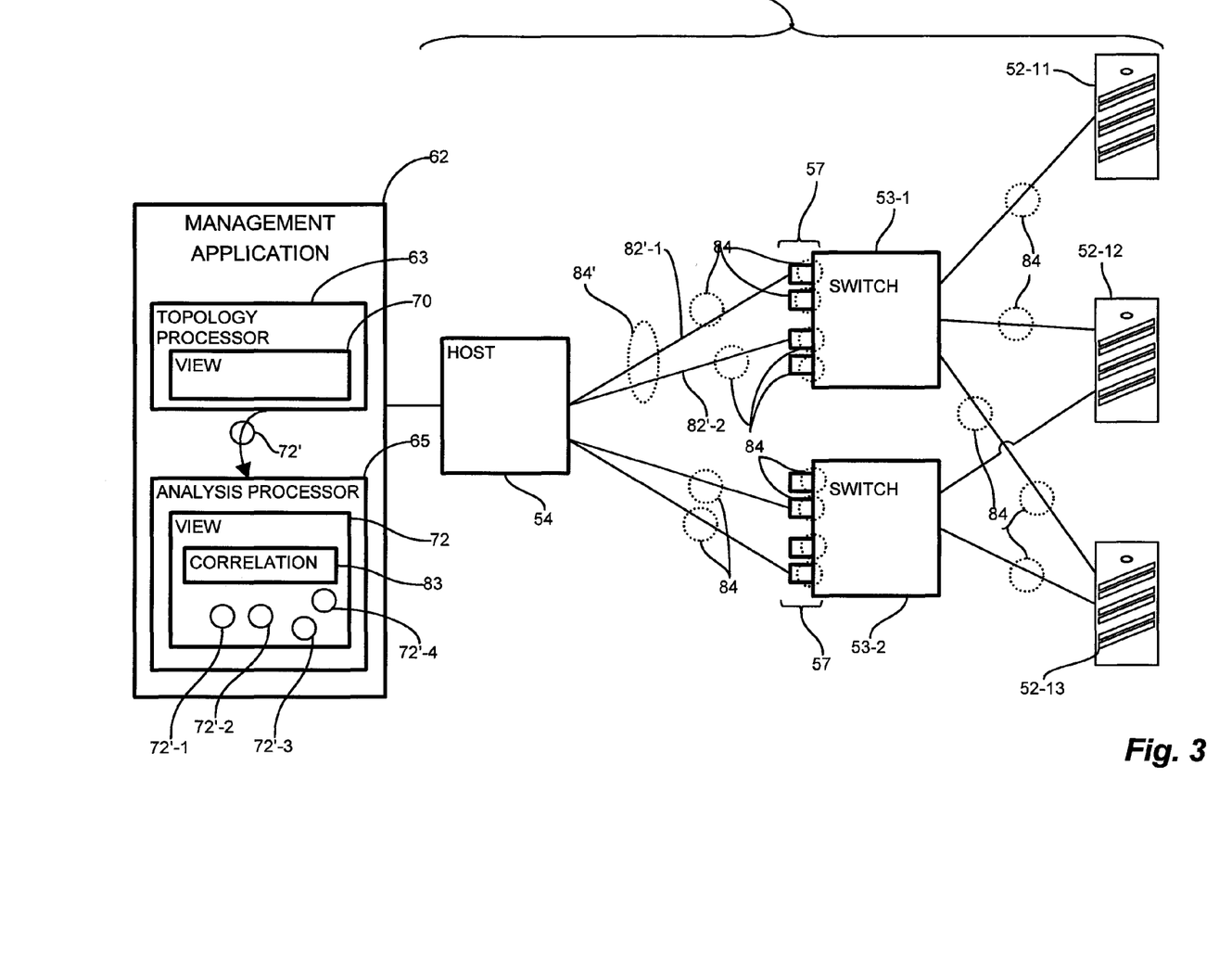
FIG. 3 shows a network diagram of an example network in the environment of FIG. 1.

FIG. 3 shows a network diagram of an example network in the environment of FIG. 1. Referring to FIGS. 1 and 3, the manageable entities 51 in the network 50 include, in the example SAN, storage arrays 52-11 . . . 52-13 connected to switches 53-1 . . . 53-2 (53 generally), each having ports 57 for coupling to a host 54. Various interconnections of hosts 54, switches 57, storage arrays 52 and other manageable entities (network entities) 51 define a network 50 in the example SAN domain. The host 54 is responsive to the management application 62, which includes a topology processor 63 and an analysis processor 65. The topology processor 63 defines and builds the topology view 70, and the analysis processor 65 instantiates analysis objects 72'-1 . . . 72'-4 (72' generally) from the analysis element 300 to generate the analysis view 72. Therefore, as the topology view 70 identifies and defines physical entities 51 and connection 82 between them, the analysis view 72 identifies and enumerates the cause/effect relationships 84 between various network entities 51. For example, a relationship the host 54 and switch 53-1 may include multiple physical connections 82'1- and 82'-2, the analysis view 72 derives a relationship 84' defined by the redundant connectivity between the host 54 and switch 53-1.

Figure 4:
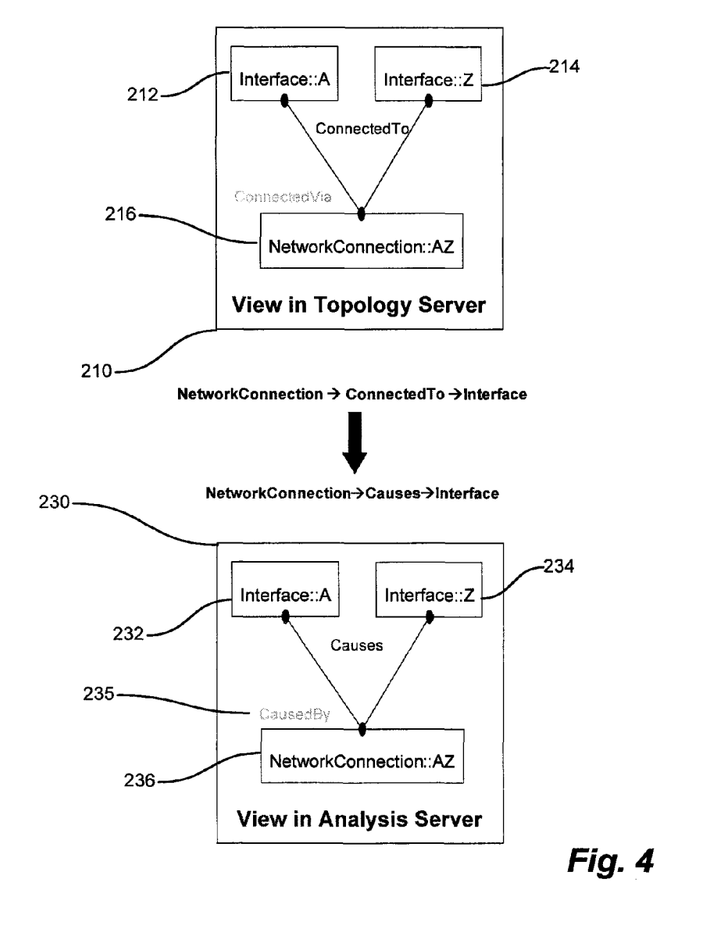
FIG. 4 shows an example cause/caused by relationship in the network of FIG. 3.

FIG. 4 shows an example cause/caused by relationship in the network of FIG. 3. Referring to FIGS. 3 and 4, a topology relationship 210 transforms into an analysis relationship 230. A network interface A 212 connects to interface Z 214 via network connection AZ 216. The interfaces 212 and 214 may be a physical connection 82, such as a port, or a logical connection multiplexed through a port, for example. The transformation of the topology relationship 210 to the analysis relationship 230 identifies the interfaces A 232 (derived from topology interface 212) and interface Z 234 (derived from topology interface 214), and determines a caused by relationship 235 to network connection AZ 236. The caused by 235 relationship identifies that an event affecting network connection AZ 236 may potentially be caused by interfaces 232 and/or 234, and conversely, that an event affecting interfaces 232 or 234 may cause a state or occurrence affecting network connection 236. The significance of the causes/caused by 235 relationship type, as well as the other relations impacts/impacted by and aggregates/aggregates to is now discussed further in FIG. 5, below.

Figure 5:
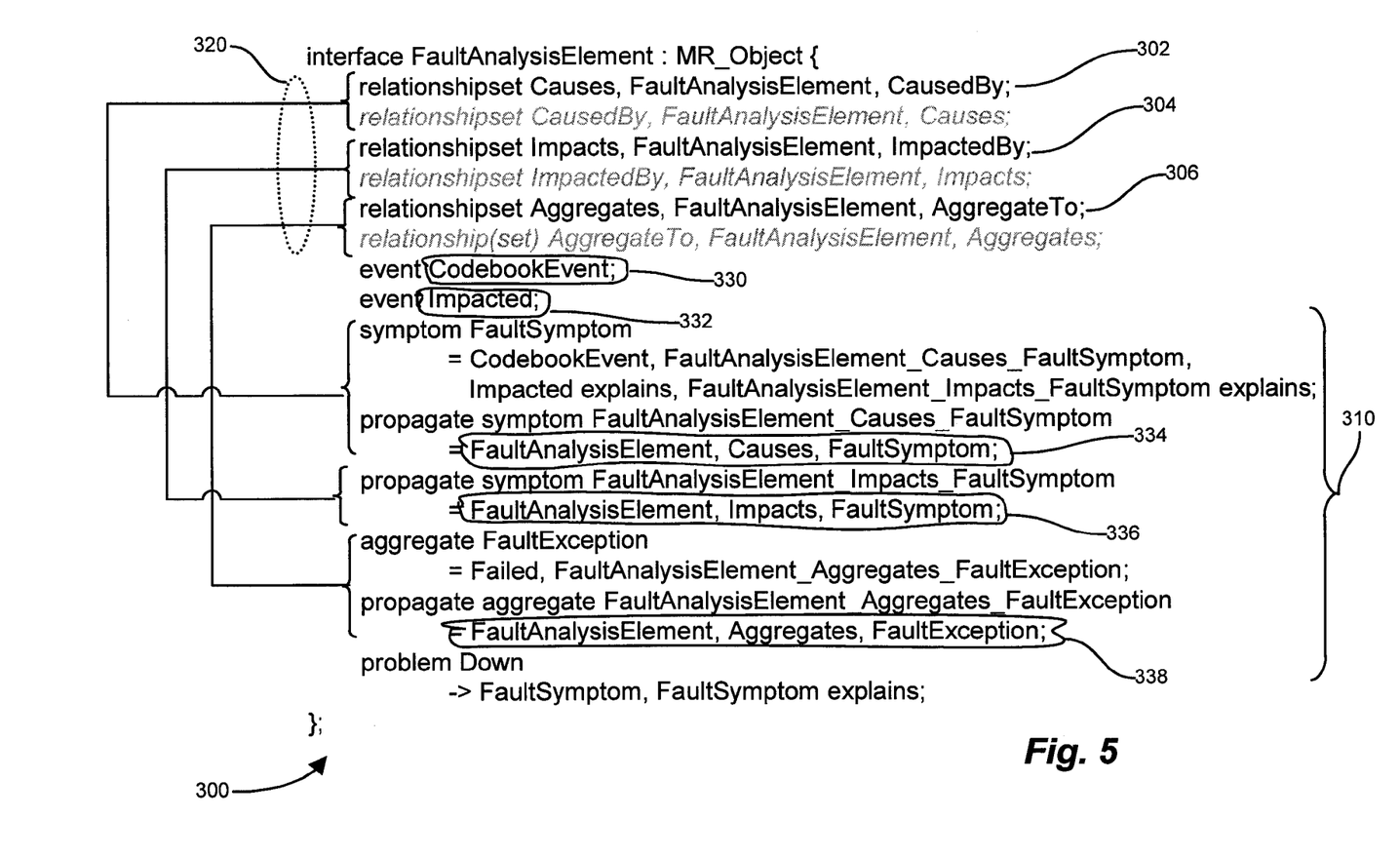
FIG. 5 shows an example instantiation of a fault analysis object suitable to depict the relationships.

FIG. 5 shows an example instantiation of a fault analysis object 72' suitable to depict the defined relationships 84. Referring to FIG. 5, an example of the fault analysis element 300 is shown. This element 300 inherits an object MR object (management relationship) 72' operable for instantiation according to an implementation language (i.e. java, c++, c) suitable for storing and processing the relationships identified and gathered by the analysis processor 65. Each type of relationship 84 (cause, impact, aggregation) is handled by the MR object 72', and includes related entities 51 defined by subclasses 310, or subfields. Each type 302, 304 and 306 has corresponding subclasses, shown by lines 320. The element 300 includes subfields CodebookEvent 330 and Impacted 332, depicting the determined root cause event and a resulting event, respectively. As indicated above, the codebook mechanism handled conventional events via sparse matrix processing.

A cause subfield 334 indicates the network entity 51 that is the underlying cause of the event. An impact subfield 336 indicates the network entity 51 that is impacted by a particular event 80, and an aggregates subfield 338 indicates entities that may be affected as part of or included in an affected network entity 51. Each instantiation 72' of the fault analysis element 300 is operable to store at least one of a cause relationship 302, an impact relationship 304, or an aggregate relationship 306. For each of the types of relationships 302, 304, and 306, the structure depicted by the fault analysis element 300 is an example; other representations may be instantiated in alternate configurations to depict the generic relationships derived from topological views as described above.

Figure 6:
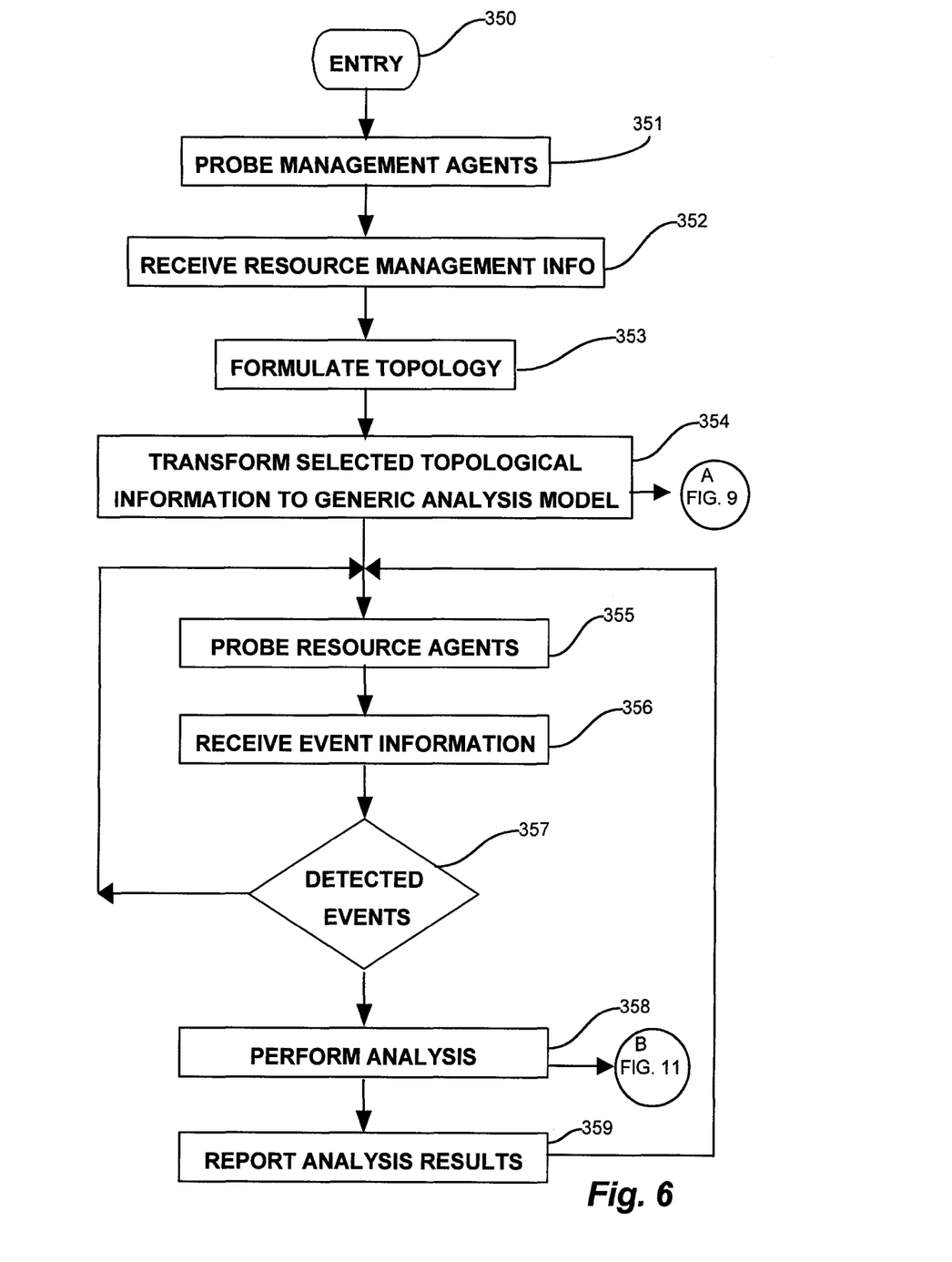
FIG. 6 shows a flowchart of evaluation of network health according to configurations disclosed herein.

FIG. 6 shows a flowchart of evaluation of network health according to configurations disclosed herein. Referring to FIG. 6, after startup at step 350, the management application 62 performs discovery of the network by probing management agents, as show at step 351. The management application 62 receives resource management information from the agents, as shown at step 352, and uses the information to formulate the topology view 70, as depicted as step 353. The management application 62 then transforms the topology information from the gathered topology view 70 to a generic analysis model codified in the analysis view 72, as depicted at step 354 and continued in further detail below with respect to FIGS. 9 and 10.

The management application 62 then maintains network health by periodically probing resource agents, as shown at step 355, and receives event 80 information as conditions and faults in the network 50 occur, as disclosed at step 356. If an event 80 is detected, at step 357, the analysis processor 65 performs analysis on the event 80 to compute the cause from the relationships 84 defined in the analysis view 72, as shown at step 358 and continued in further detail with respect to FIGS. 11 and 12. The management application 62 reports analysis results, as disclosed at step 359, and control reverts to step 355 to continue monitoring.

Figure 7:
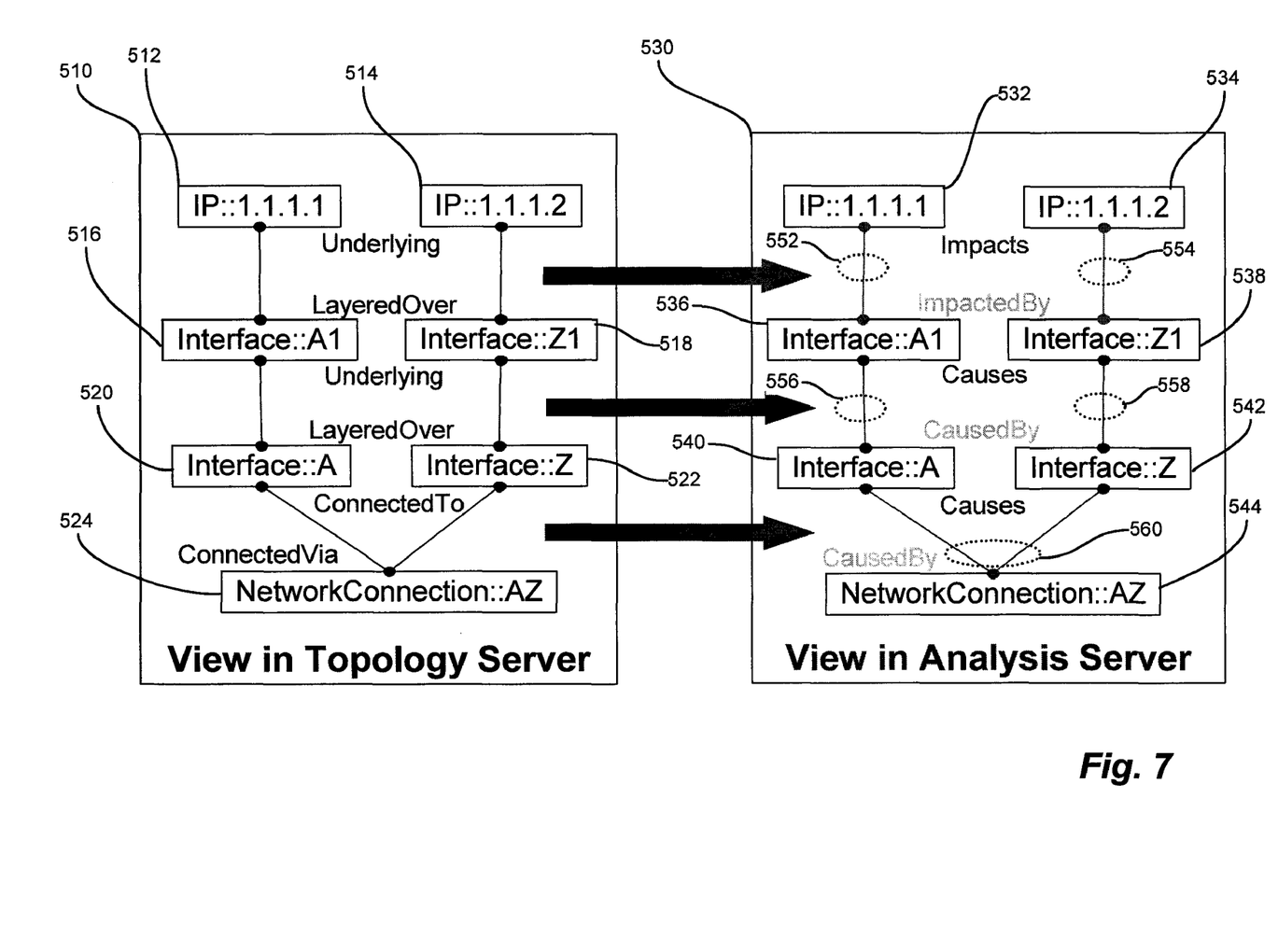
FIG. 7 shows an example of an impacted/impacted by relationship suitable for use with the analysis object of FIG. 5.
Figure 9:
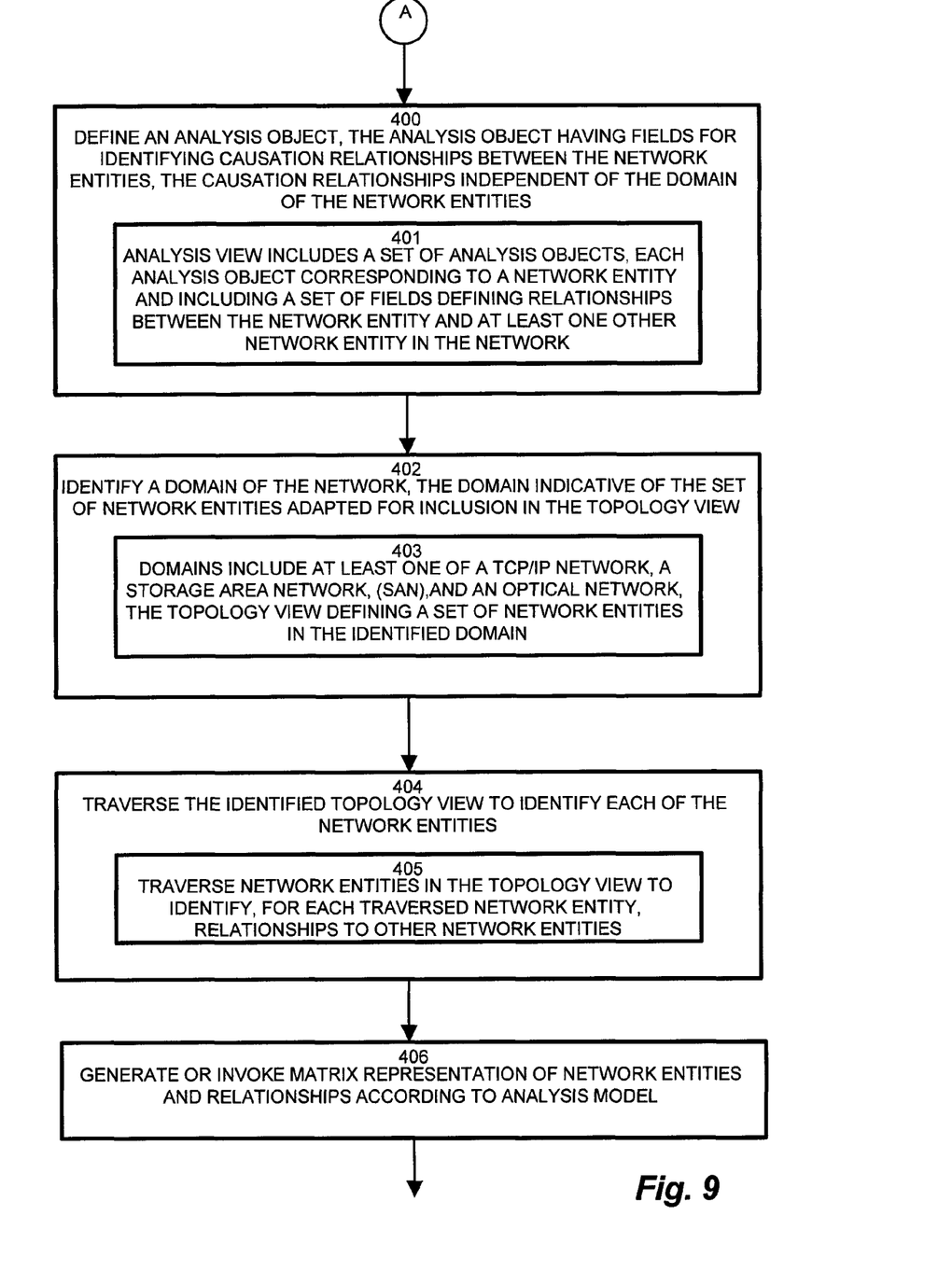
FIGS. 9 and 10 show further detail of transformation of a topological view to an analysis view in the evaluation sequence of FIG. 6.

FIG. 7 shows an example of an impacted/impacted by relationship suitable for use with the analysis element 300 of FIG. 5. Referring to FIG. 9, a topology server view 510 includes network nodes having underlying IP addresses 512 and 514. The IP addresses 512, 514 each define a logical interface A1 516 and Z1 518, respectively. These logical interfaces A1, Z1 are provided by connections (interfaces) A 520 and Z 522, both connected via network connection AZ 524. After transformation to the analysis server, the node 532 (IP::1.1.1.1) has an impacts/impacted by relationship 552 with interface A1 536. Similarly, the node IP::1.1.1.2 534 has an impacts/impacted by relationship 554 with interface Z1 538. In other words, the layered relation between IP addresses 512, 514 to interfaces 516, 518 defines an impact relationship in the analysis server 530. These relationships further propagate to cause/caused by relationships 556 between interface A1 and A, and relationship 558 between Z1 and Z, and further to a causes/caused by relationship 560 between network connection 544 and interface A and Z.

Figure 8:
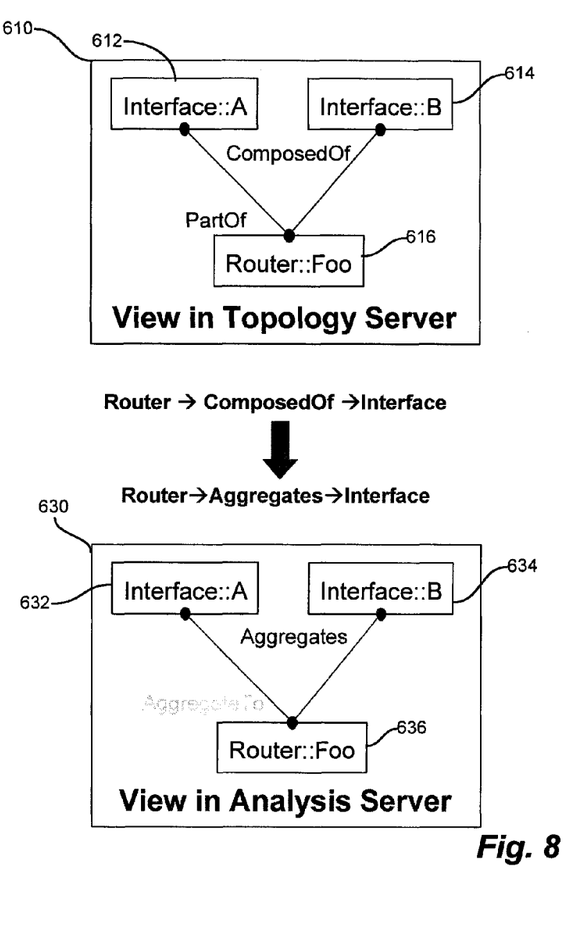
FIG. 8 shows an example of an aggregation relationship suitable for use with the analysis object of FIG. 5.
Figure 12:
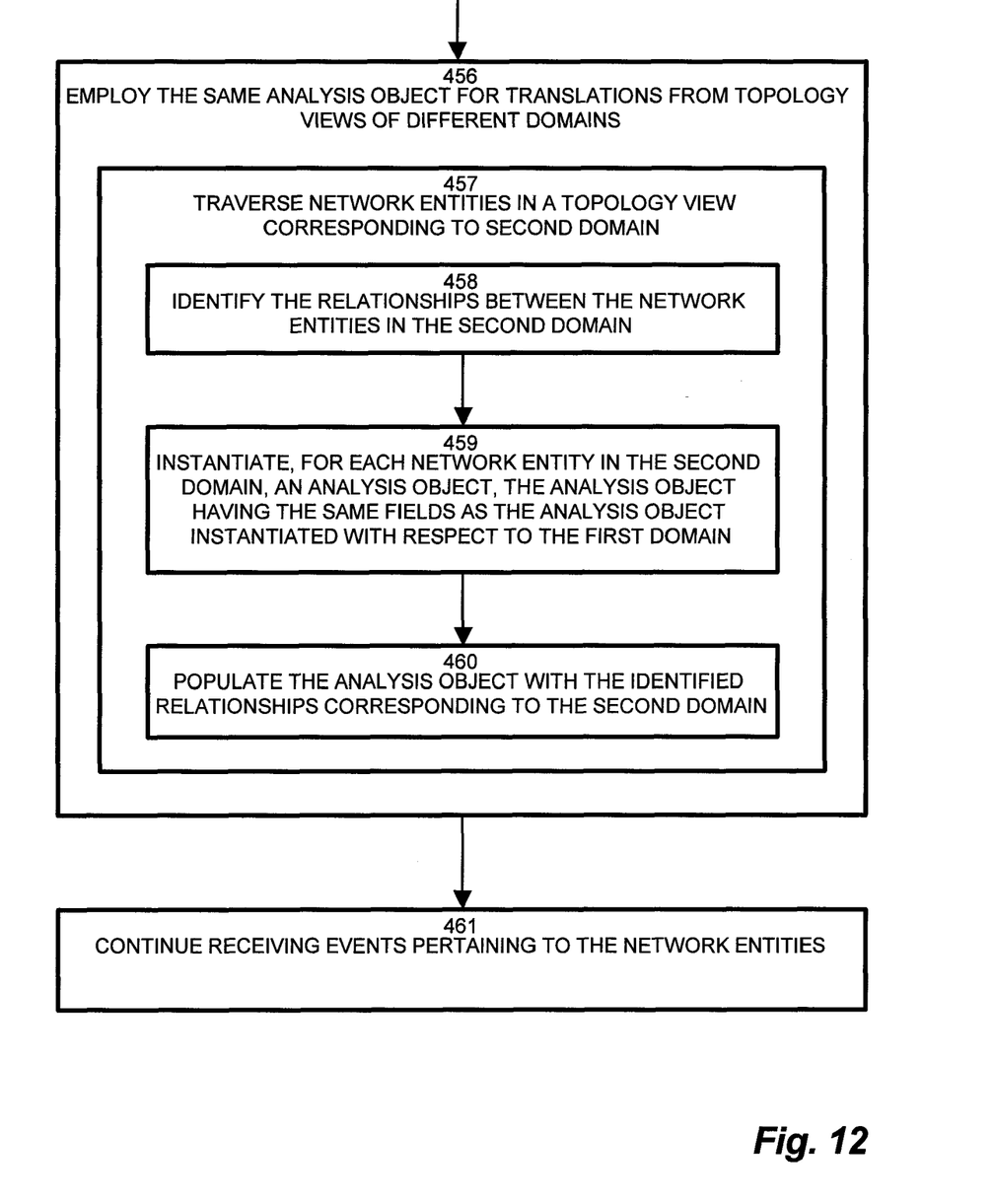

FIG. 8 shows an example of an aggregation relationship suitable for use with the analysis object of FIG. 5. Referring to FIG. 12, a topology of Interfaces A and B included in router Foo is shown, such as ports, for example. The topology view 610 includes interfaces 612 and 614 connected via router 616, depicting topology relation 618. Thus, the topology view depicts that interfaces A and B (612, 614) are part of the router Foo 616, and router Foo is composed of the interfaces 612 and 614. A corresponding analysis view 630, therefore, includes interfaces A 632 and B 634 as aggregates of router foo 636, and that the interfaces 632 and 634 aggregate to router Foo 636. Note that it is likely that a typical router includes more than two interfaces; each such interface (i.e. a port or connection) defines a new aggregates/aggregates to relationship.

Figure 10:
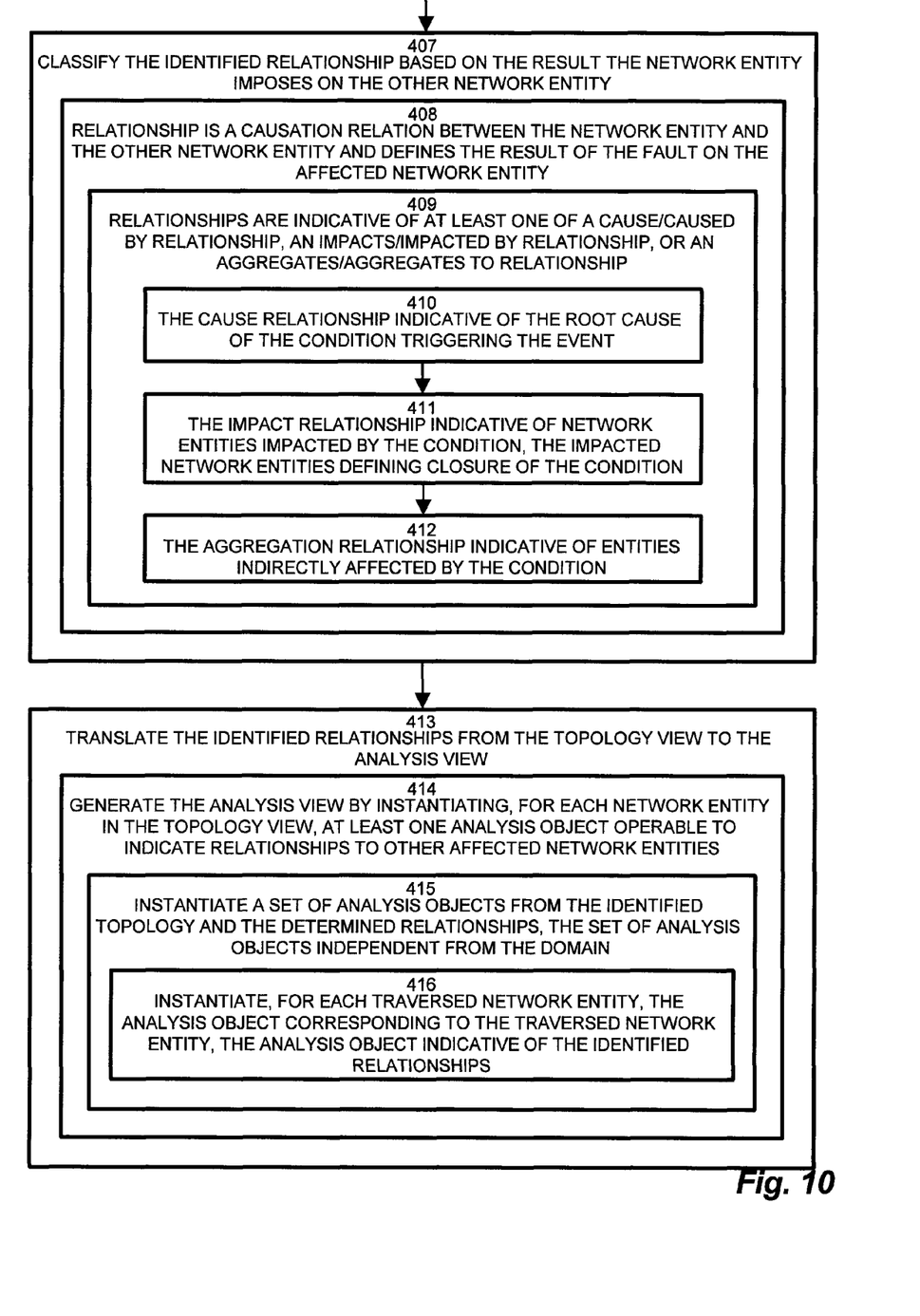

FIGS. 9 and 10 show further detail of transformation of a topological view to an analysis view in the evaluation sequence of FIG. 6. Referring to FIGS. 3, 6 and 9-10, at step 400 translating the topology view to the analysis view further includes defining an analysis object, such that the analysis object 72' has fields for identifying causation relationships 84 between the network entities 51, the causation relationships independent of the domain of the network entities 51. The analysis view 72 includes a set of analysis objects 72', in which each analysis object 72' corresponding to at least one network entity 51 and includes a set of fields 310 defining relationships 84 between the network entity 51 and at least one other network entity 51 in the network 50, as depicted at step 401. The management application 62 identifies a domain of the network 50, such that the domain is indicative of the set of network entities 51 adapted for inclusion in the topology view 70, shown at step 402. As indicated above, the topology view 70 enumerates the physical interconnections between the network entities 51, which directly or indirectly define the relationships 84 included in the analysis view 72. The domains may include at least one of a TCP/IP network, a Storage Area Network, (SAN), an optical network, or other suitable infrastructure, in which the topology view defines a set of network entities 51 in the identified domain, as depicted at step 403.

The management application 62 then traverses the identified topology view 70 to identify each of the network entities 51, as shown at step 404. Alternative arrangements may employ a variety of discovery operations in order to ascertain the physical topology of the network 50. In the example arrangement, the management application 62 traverses network entities in the topology view to identify, for each traversed network entity, relationships to other network entities 51, as disclosed at step 405.

The management application generates or invokes a correlation 83 indicative of the identified relationships and the respected affected network entities 51. A variety of implementations may be employed to provide the correlation as describe by the codebook above. This correlation associates events and symptoms derived thereof to causes or problems in the network. It further defines the omission of events as indicative of a symptom, such as a "ping" or heartbeat signal not received from a network entity, for example. In operation, such a matrix or representation denotes network entities 51 affected by other network entities according to the analysis model, as disclosed at step 406. The management application 62 then classifies the identified relationship based on the result the network entity 61 imposes on the other network entity 61, as depicted at step 407. This generally involves examining the nature of the connection, such as physical or logical and the network "distance" between the entities, such as an inclusion (i.e. switch includes a port), a physical link, or a path. This relationship 84 defines a causation relation between the network entity 51 and the other network entity 51, as shown at step 408 and defines the result of a fault or condition 80 (usually a failure or deficiency event) on the affected network entity 51. In the example configuration shown, the relationships 84 are indicative of at least one of a cause/caused by relationship, an impacts/impacted by relationship, or an aggregates/aggregates to relationship, as depicted at step 409. A cause relationship is indicative of the root cause of the condition triggering the event, as disclosed at step 410. An impact relationship is indicative of network entities 51 impacted by the condition, in which the impacted network entities 51 define closure of the fault or condition, as depicted at step 411, and an aggregation relationship is indicative of multiple events pertaining to the condition, as shown at step 412.

The management application 62 translates the identified relationships from the topology view 70 to the analysis view 72 by instantiating and populating the analysis object 300, as depicted at step 413. The analysis processor 65 therefore generates the analysis view 72 by instantiating, for each network entity in the topology view 70, at least one analysis object 72' operable to indicate relationships 84 to other affected network entities 51, as disclosed at step 414. This includes, at step 414, instantiating a set of analysis objects from the identified topology view 70 and the determined relationships 84, such that the set of analysis objects 72'-N is independent from the domain of the network 50, as depicted at step 415. Thus, the analysis processor 65 instantiates, for each traversed network entity 51, an analysis object 72' corresponding to the traversed network entity, such the analysis object 72' is indicative of the identified relationships 84, as shown at step 416.

Figure 11:
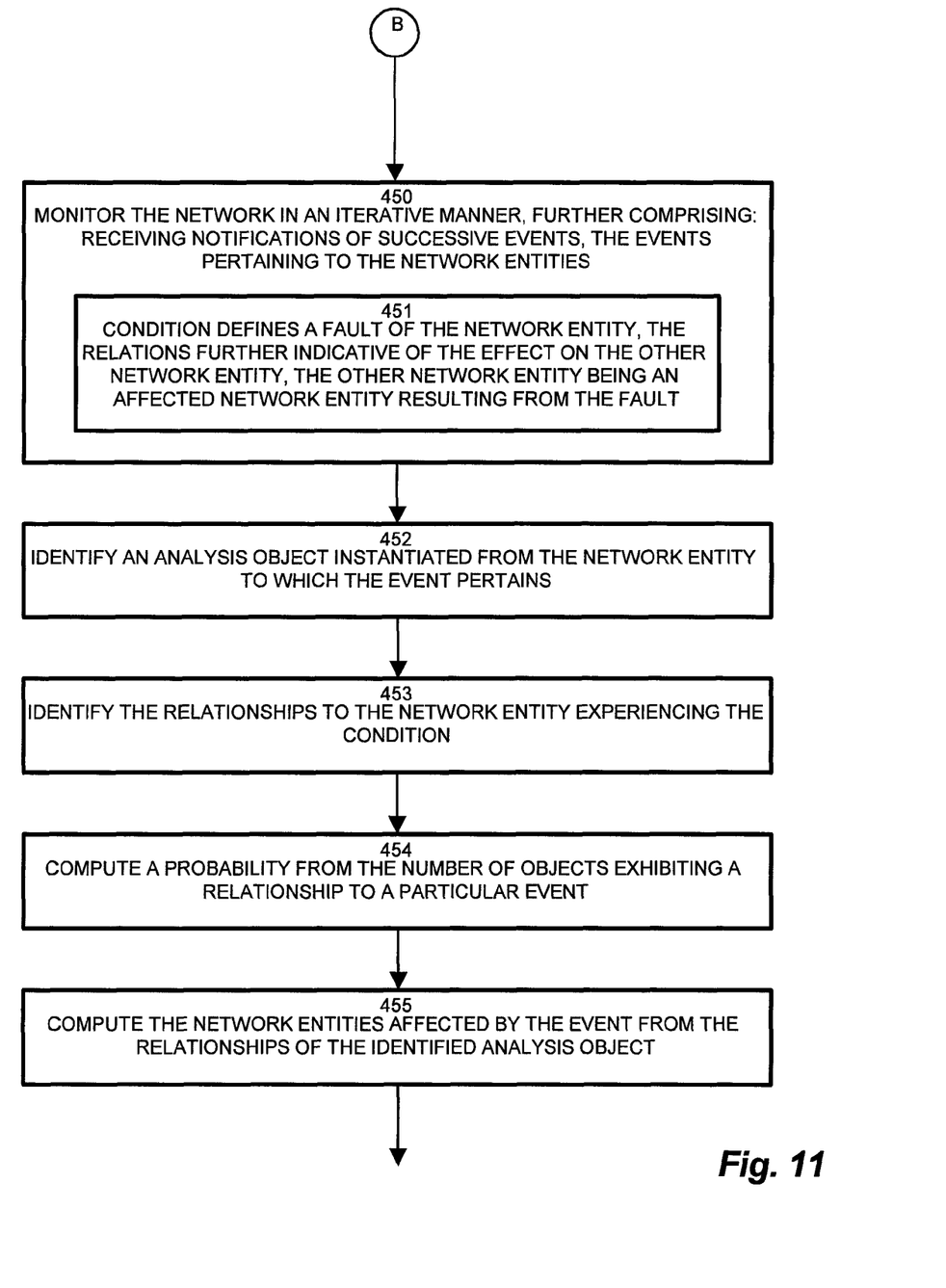
FIGS. 11 and 12 show further detail of event analysis using the fault analysis object of FIG. 5 in the evaluation sequence of FIG. 6.

FIGS. 11 and 12 show further detail of event analysis using the fault analysis object of FIG. 5 in the evaluation sequence of FIG. 6. Referring to FIGS. 3, 6 and 11-12, using the analysis view 72 transformed from the topology view 70, the management application 62 monitors the network in an iterative manner by receiving notifications of successive events 80, in which the events 80 pertain to the network entities 51, as disclosed at step 450. The event 80 is indicative of a condition defining a fault of a network entity 51, in which the relations 84 are further indicative of the effect on one or more other network entities 51, such that the other network entity is an affected network entity 51 resulting from the fault 80, as depicted at step 451.

In response, the analysis processor 65 identifies an analysis object 72' instantiated from the network entity 51 to which the event 80 pertains, as shown at step 452. The analysis processor 65 identifies the relationships to the network entity 51 experiencing the condition from the analysis object 72', and computes a probability from the number of objects 72' exhibiting a relationship 84 to a particular event 80, as depicted at step 454. In contrast, conventional analysis employing the matrix approach such as the codebook from a topology model may only identify a possibility of a causal effect, and do not employ a mechanism for associating the condition to more likely or less likely causes. From the relationships, the analysis processor 65 computes the network entities 51 affected by the event 80 from the relationships 84 of the identified analysis object 72', as shown at step 455, for determining and displaying the underlying root cause of the condition or problem. The analysis processor 65 may receive successive events 80 indicative of conditions of the network entities 51, and repeat the traversing to identify relationships corresponding to the network entity 51 affected by the successive events 80.

The analysis processor 65 may then employ the same analysis object, or element 300, for translations from topology views 70 of different domains, as depicted at step 456. Therefore, the management application 62 is operable to traverse network entities 51 in a topology view 70 corresponding to second domain, as shown at step 457, and identify the relationships 84 between the network entities 51 in the second domain, as depicted at step 458. The management application 62 instantiates, for each network entity 51 in the second domain, an analysis object 72', such that the analysis object 72' has the same fields as the analysis object 72' instantiated with respect to the first domain, as disclosed at step 459. The analysis processor 65 therefore populates the analysis object 72' with the identified relationships 84 corresponding to the second domain, as depicted at step 460. The management application 65 then continues receiving events 80 pertaining to the network entities 51, as shown at step 461.

Those skilled in the art should readily appreciate that the programs and methods for evaluating network health as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for evaluating network health comprising has been particularly shown and described with references to embodiments thereof, it will be understood by those skilled in the art that various changes in form and details may be made therein without departing from the scope of the invention encompassed by the appended claims.

What is claimed is:

1. A method of evaluating a system, comprising:
   identifying a topology view, the topology view defining interconnections between entities;

identifying a domain, the domain indicative of the set of entities adapted for inclusion in the topology view;

determining a set of relationships between the entities identified in the topology view, each relationship included in the set of relationships between a plurality of entities defining how events affect the related entities defined by the relationship;

translating, using the determined set of relationships, the topology view to an analysis view, the analysis view independent of the topology and applicable to a variety of domains;

receiving an event, the event indicative of a condition of at least one of the entities;

assessing, based on probability factors, a symptom based on the received event;

traversing the analysis view to identify relationships corresponding to the entity affected by the event, the affected entity having an effect on other entities as defined by the set of relationships; and concluding through the use of a correlation of the assessed symptom to problems that a set of manifested and omitted events are related based on the relationships constructed in the analysis view.

2. The method of claim 1 wherein the analysis view includes a set of analysis objects, each analysis object corresponding to a network entity and including a set of fields defining relationships between the network entity and at least one other network entity in a network, further comprising:

receiving at least one successive event indicative of conditions of the network entities;

assessing, based on a codebook correlating symptoms and causes, each of the successive events and omissions of events to identify likely causes;

repeating the traversing to identify relationships corresponding to the network entity affected by the successive events.

3. The method of claim 2 wherein the condition defines a fault of the network entity, the relations further indicative of the effect on the other network entity, the other network entity being an affected network entity resulting from the fault.

4. The method of claim 3 wherein the relationship is a causation relation between the network entity and the other network entity and defines the result of the fault on the affected network entity.

5. The method of claim 3 wherein the relationships are indicative of at least one of a cause/caused by relationship, an impacts/impacted by relationship, or an aggregates/aggregates to relationship, the cause relationship indicative of the root cause of the condition triggering the event, the impact relationship indicative of network entities impacted by the condition, the impacted network entities defining closure of the condition; and the aggregation relationship indicative of multiple events pertaining to the condition.

6. The method of claim 2 wherein determining a set of relationships further comprises:

traversing the identified topology view to identify each of the network entities;

instantiating a set of analysis objects from the identified topology and the determined relationships, the set of analysis objects independent from the domain.

7. The method of claim 2 further comprising generating the analysis view by instantiating, for each network entity in the topology view, at least one analysis object operable to indicate relationships to other affected network entities.

8. The method of claim 7 wherein concluding the result further comprises:

identifying the relationships to the network entity experiencing the condition;

indexing a correlation of network entities, the correlation of relations to other network entities according to the analysis view; and computing a probability from the number of objects exhibiting a relationship to a particular event.

9. The method of claim 2 wherein the domains include at least one of a TCP/IP network, a Storage Area Network, (SAN), and an optical network, the topology view defining a set of network entities in the identified domain, further comprising:

translating the identified relationships from the topology view to the analysis view; and employing the same analysis object for translations from topology views of different domains.

10. The method of claim 1 wherein the entities are network entities in an IT infrastructure, translating the topology view to the analysis view further comprising:

defining an analysis object, the analysis object having fields for identifying causation relationships between the network entities, the causation relationships independent of the domain of the network entities;

traversing network entities in the topology view to identify, for each traversed network entity, relationships to other network entities;

classifying the identified relationship based on the result the network entity imposes on the other network entity; and instantiating, for each traversed network entity, the analysis object corresponding to the traversed network entity, the analysis object indicative of the identified relationships.

11. The method of claim 10 wherein the domain is a first domain, further comprising:

traversing network entities in a topology view corresponding to a second domain corresponding to a second topology view;

identifying the relationships between the network entities in the second domain;

instantiating, for each network entity in the second domain, an analysis object, the analysis object having the same fields as the analysis object instantiated with respect to the first domain; and populating the analysis object with the identified relationships corresponding to the second domain.

12. The method of claim 1 further comprising monitoring a network in an iterative manner, the entities comprising network entities in the network, further comprising:

receiving notifications of successive events, the events pertaining to the network entities;

identifying an analysis object instantiated from the network entity to which the event pertains;

computing the network entities affected by the event from the relationships of the identified analysis object; and continuing receiving events pertaining to the network entities.

13. A management server for evaluating network health comprising:

a management application having a topology processor for identifying a topology view of a network, the topology view defining interconnections between network entities, the topology processor further operable to identify a domain of the network, the domain indicative of the set of network entities adapted for inclusion in the topology view;

the management application further operable to determine a set of relationships between the network entities identified in the topology view, each relationship included in the set of relationships between a plurality of network entities defining how events affect the related network entities defined by the relationship;

an analysis processor in the management application for translating, using the determined set of relationships, the topology view to an analysis view, the analysis view independent of the topology and applicable to a variety of domains; and an interface to a network for receiving an event, the event indicative of a condition of at least one of the network entities, the analysis processor further operable to traverse the analysis view to identify relationships corresponding to the network entity affected by the event, the affected entity having an effect on other network entities as defined by the relationships, and conclude the result that the event manifests on the other related network entities based on the relationships.

14. The server of claim 13 wherein the analysis view includes a set of analysis objects, each analysis object corresponding to a network entity and including a set of fields defining relationships between the network entity and at least one other network entity in the network.

15. The server of claim 14 wherein the condition defines a fault of the network entity, the relations further indicative of the effect on the other network entity, the other network entity being an affected network entity resulting from the fault.

16. The server of claim 15 wherein the relationship is a causation relation between the network entity and the other network entity and defines the result of the fault on the affected network entity.

17. The server of claim 14 wherein the management application is further operable to identify a set of relationships by:
traversing the identified topology view to identify each of the network entities; and
instantiating a set of analysis objects from the identified topology and the determined relationships, the set of analysis objects independent from the domain.

18. The server of claim 13 wherein the analysis processor is further operable to:
define an analysis object, the analysis object having fields for identifying causation relationships between the network entities, the causation relationships independent of the domain of the network entities;
traverse network entities in the topology view to identify, for each traversed network entity, relationships to other network entities;
classify the identified relationship based on the result the network entity imposes on the other network entity; and
instantiate, for each traversed network entity, the analysis object corresponding to the traversed network entity, the analysis object indicative of the identified relationships, to generate the analysis view.

19. The server of claim 18 wherein the domain is a first domain and the analysis processor is further operable to:
traverse network entities in a topology view corresponding to second domain;
identify the relationships between the network entities in the second domain;
instantiate, for each network entity in the second domain, an analysis object, the analysis object having the same fields as the analysis object instantiated with respect to the first domain; and
populate the analysis object with the identified relationships corresponding to the second domain.

20. A computer program product having a non-transitory computer readable medium operable to store computer program logic embodied in computer program code encoded as a set of processor based instructions thereon, that, when executed by the processor cause the computer to perform steps for monitoring network events comprising:
computer program code for identifying a topology view of a network, the topology view defining interconnections between network entities;
computer program code for identifying a domain of the network, the domain indicative of the set of network entities adapted for inclusion in the topology view;
computer program code for determining a set of relationships between the network entities identified in the topology view, each relationship included the set of relationships between a plurality of network entities defining how events affect the related network entities defined by the relationship;
computer program code for translating, using the determined set of relationships, the topology view to an analysis view, the analysis view independent of the topology and applicable to a variety of domains;
computer program code for receiving an event, the event indicative of a condition of at least one of the network entities;
computer program code for traversing the analysis view to identify relationships corresponding to the network entity affected by the event, the affected entity having an effect on other network entities as defined by the relationships; and
computer program code for concluding the result that the event manifests on the other related network entities based on the relationships, the relationships are indicative of at least one of a cause/caused by relationship, an impacts/impacted by relationship, or an aggregates/aggregates to relationship,
the cause relationship indicative of the root cause of the condition triggering the event,
the impact relationship indicative of network entities impacted by the condition, the impacted network entities defining closure of the condition; and
the aggregation relationship indicative of entities indirectly affected by the condition.

* * * * *